(12) United States Patent (10) Patent No.: US 12,210,742 B2
Zhou (45) Date of Patent: Jan. 28, 2025

(54) HUMAN-MACHINE INTERACTION SYSTEM FOR PROJECTION SYSTEM

(71) Applicant: DALIAN CZUR TECH CO., LTD, Liaoning (CN)

(72) Inventor: Kang Zhou, Liaoning (CN)

(73) Assignee: DALIAN CZUR TECH CO., LTD, Liaoning (CN)

( * ) Notice: Subject to any disclaimer, the term of this patent is extended or adjusted under 35 U.S.C. 154(b) by 460 days.

(21) Appl. No.: 17/757,067

(22) PCT Filed: Oct. 10, 2019

(86) PCT No.: PCT/CN2019/110459
§ 371 (c)(1),
(2) Date: Jun. 8, 2022

(87) PCT Pub. No.: WO2021/035883
PCT Pub. Date: Mar. 4, 2021

(65) Prior Publication Data
US 2023/0350568 A1 Nov. 2, 2023

(30) Foreign Application Priority Data

Aug. 23, 2019 (CN) .......................... 201910785877.9

(51) Int. Cl.
*G06F 3/04886* (2022.01)
*G06F 1/16* (2006.01)
(Continued)

(52) U.S. Cl.
CPC ........ *G06F 3/04886* (2013.01); *G06F 1/1639* (2013.01); *G06F 3/0383* (2013.01); *G06F 3/04162* (2019.05)

(58) Field of Classification Search
CPC ................................ H04W 4/80; H04W 12/50
See application file for complete search history.

(56) References Cited

U.S. PATENT DOCUMENTS 9,294,746 B1 * 3/2016 Cederlof .............. H04N 9/3108
2010/0085705 A1 * 4/2010 Yin .......................... G06F 3/021
361/679.58

(Continued)

FOREIGN PATENT DOCUMENTS

CN 102331842 A 1/2012
CN 102999092 A 3/2013
(Continued)

*Primary Examiner* — Wen W Huang
(74) *Attorney, Agent, or Firm* — NKL Law; Allen Xue

(57) ABSTRACT

A human-machine interaction system is used with a projector system, and includes an interactive terminal. The interactive terminal has a projection assembly for operating an application system and a control panel for issuing instructions and/or inputting data to the application system according to functional requirements. The human-machine interaction system accomplishes a complex human-machine interaction function by means of multi-mode design for automatic switching between a touch mode and a full keyboard mode of a control panel. In addition, the one-to-one correspondence combination relationship between devices is broken by means of contact detection, so that different control panels can control different intelligent conference projection systems, thereby achieving the free pairing and connection of devices.

8 Claims, 3 Drawing Sheets

(51) Int. Cl.
    *G06F 3/038*     (2013.01)
    *G06F 3/041*     (2006.01)

(56) References Cited

U.S. PATENT DOCUMENTS

| | | | | |
|---|---|---|---|---|
| 2011/0014947 | A1* | 1/2011 | Liang | H04M 1/72409 |
| | | | | 345/660 |
| 2015/0279199 | A1* | 10/2015 | Yarkoni | G08B 25/016 |
| | | | | 340/539.11 |
| 2016/0070465 | A1* | 3/2016 | Stewart | G06F 3/0488 |
| | | | | 715/773 |
| 2018/0120985 | A1* | 5/2018 | Wallace | G06F 1/169 |
| 2019/0155343 | A1* | 5/2019 | Campbell | G06F 1/1681 |
| 2021/0196122 | A1* | 7/2021 | Gerder | A61B 5/02055 |

FOREIGN PATENT DOCUMENTS

| | | |
|---|---|---|
| CN | 109068087 A | 12/2018 |
| WO | 2012002915 A1 | 1/2012 |

\* cited by examiner

HUMAN-MACHINE INTERACTION SYSTEM FOR PROJECTION SYSTEM

FIELD OF THE INVENTION

The present disclosure relates to the field of human-machine interaction, in particular to a human-machine interaction system for a projection system.

BACKGROUND

With the continuous development of human-machine interaction technology, the radiation range thereof has covered the field of intelligent projection system. At present, the commonly used projection interaction mainly include human-machine interaction of machine-body hardware key, human-machine interaction of infrared remote control combined with machine-body hardware key, and human-machine interaction of Bluetooth remote control combined with machine-body hardware key. In order to realize the basic functions of the projection system, such as display and sharing, the installation of the projection device needs to be separated from the screen at a certain distance. Therefore, most of the projection devices are installed by means of hanging installation, which causes inconvenience in the operation of the machine-body keys. Most of the interactions based on remote control technology only consider the portability of the remote controller in the hardware design, no matter using one hand or two hands it is not suitable for the scene of human-machine interaction for a long time. In particular, it is cannot experience a good support or even cannot support the functions of text input, text selection, text editing, moving the projection display picture anywhere and clicking the picture. In addition, the existing interaction based on Bluetooth technology can only realize one-to-one binding remote control, which is not a real connection remote controller. The existing projection system cannot provide more high-end human-machine interaction of voice and visual.

SUMMARY OF THE INVENTION

According to the above-mentioned technical problems of poor functionality of human-machine interaction in the existing projection system, it is an object of the present disclosure to provide a human-machine interaction system for a projection system. The present disclosure realizes the complex human-machine interaction function by using a multi-mode design of automatic switching between a touch mode and a full keyboard mode of the control panel.

The technical solutions adopted in the present disclosure are as follows:

A human-machine interaction system for a projection system includes an interactive terminal. The interactive terminal includes a projection assembly for operating an application system and a control panel for issuing instruction to the application system according to functional requirement and/or inputting data.

Further, the control panel identifies the functional requirement according to a cursor indication position at a projection picture. The functional requirement includes an indication requirement and an input requirement.

Further, the control panel is configured as a touch mode after identifying the indication requirement.

Further, the control panel is configured as an input mode after identifying the input demand.

Further, the control panel includes a setting area for setting working parameters of the projection assembly and an operation area for issuing instructions in the touch mode and inputting data in the input mode.

Further, after being configured as the input mode, the control panel defines a visible keyboard area at the operation area in response to user's pressing action.

Further, the control panel further includes a backlight control assembly.

Further, the projection assembly has a connecting area charging the control panel by means of a connecting device.

Further, the connecting area is a groove configured to receive the control panel, and the connecting device includes a projection assembly charging contact arranged inside the groove and a connecting device charging contact arranged on the control panel.

Further, the connecting area is a groove configured to receive the control panel. The groove has a contact for the projection assembly and the control panel comprises a corresponding contact for the control panel. A connection between the projection assembly and the control panel is established by contacting the contact for the projection assembly with the corresponding contact for the control panel.

Further, the connection between the projection assembly and the control panel established by contacting the contact for the projection assembly with the corresponding contact for the control panel includes that the control panel judges whether the corresponding contact for the control panel is contacted with the contact for the projection assembly, if not, the connection is terminated, if contacted, a forced connection broadcast is sent out. When the projection assembly receives the forced connection broadcast and judges whether the contact for the projection assembly is contacted with the corresponding contact for the control panel, if not, the connection is terminated, if contacted, further judges whether the connected control panel is the device that currently sends the forced connection broadcast, if so, the connection is terminated, if not, the original connection is disconnected, and the connection is terminated after the device that sends the forced connection broadcast device is reconnected.

Further, the projection assembly interacts data with the control panel in a wireless manner.

Further, the control panel has anti-slip areas on both sides of the back.

Further, the projection assembly includes an expandable connected multi microphone array to realize automatic pickup of voice input.

Further, the projection assembly further includes an expandable connected wide-angle lens to realize automatic pickup of visual input.

Compared with the prior art, the present disclosure has the following advantages:

1. The present disclosure is applied to an intelligent conference projection system, which can carry out complex human-machine interaction and control, such as cursor movement and cursor click similar to touch screen, and text input, text selection and text editing based on full keyboard.

2. The control panel in the present disclosure is hand-held for comfort and convenience, which can provide the user with human-machine interaction for a long time. The user can respond smoothly no matter the control panel is held with one hand or two hands. Meanwhile, the automatic charging of Bluetooth control panel makes users never need to worry about the power-off of the device.

3. The present disclosure uses the contact detection technology to enable the control panel to control different intelligent conference projection systems, which breaks the one-to-one corresponding combination between devices and solves the problem of free combination and connection of devices.

4. The anti-slip design at the bottom of the control panel of the present disclosure can provide a comfortable and stable interaction mode of flat placement.

5. The present disclosure can provide intelligent voice interaction mode and intelligent visual interaction by combining the multi microphone array and the wide-angle lens above 180° attached to the projection assembly.

The present disclosure provides a new type man-machine interaction mode for an intelligent conference projection system, which can be applied to a projection system and an intelligent conference projection system.

BRIEF DESCRIPTION OF THE DRAWINGS

The drawings used in the embodiments or the prior art will be briefly described herein to more clearly describe the embodiments of the present invention or the technical solutions in the prior art. Apparently, the following described drawings are merely embodiments of the present invention. For those ordinary skilled in the art, other drawings can also be obtained according to the provided drawings without creative labor.

DETAILED DESCRIPTION OF THE INVENTION

Figure 1:
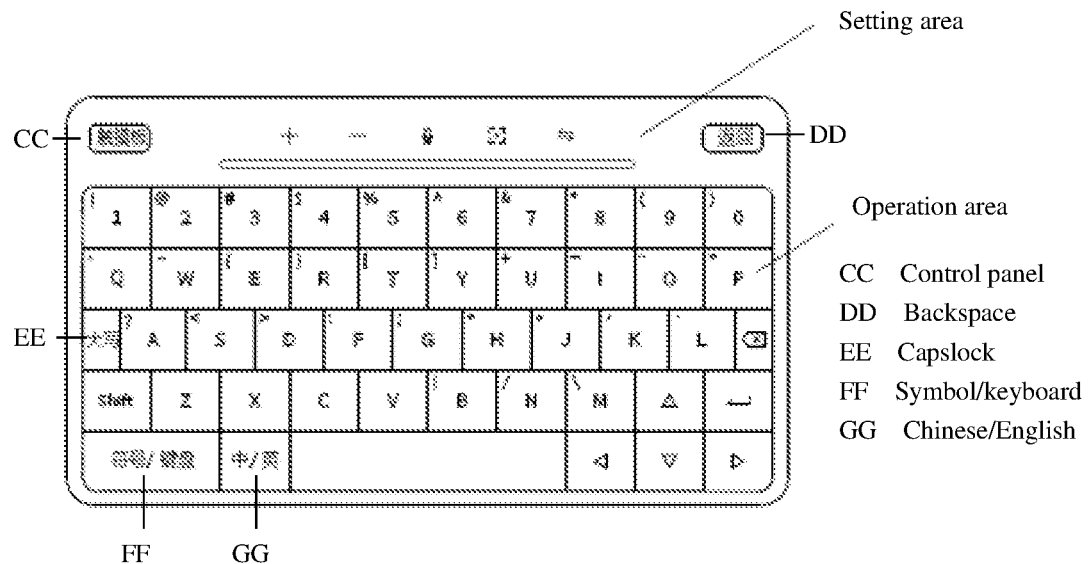
FIG. 1 is a top view of the control panel of the present disclosure.

It should be noted that, the embodiments and the characteristics in the embodiments of the present disclosure can be combined with each other without conflict. The present disclosure will be illustrated in detail by referring to the accompany drawings combining with the embodiments.

To make the objectives, technical solutions, and advantages of the present disclosure clearer, a clear and complete description of the technical solutions in embodiments of the present disclosure will be presented in conjunction with the accompanying drawings. Obviously, the described embodiments are only some, but not all, embodiments of the invention. According to the embodiments of the present disclosure, all other embodiments obtained by those ordinary skilled in the art without creative labor should fall within the protection scope of the present disclosure.

A human-machine interaction system for a projection system, applied to a projector system, includes an interactive terminal. The interactive terminal has a projection assembly for operating an application system and a control panel for issuing instruction to the application system according to a functional requirement and/or inputting data. The control panel can control the projection action of the projection assembly and take the picture projected by the projection assembly as the control interface to control and edit the projected content. Compared with conventional computer devices, the picture content projected by the projection assembly is equivalent to the display interface of the displayer, and the control panel is equivalent to the input devices such as mouse and keyboard.

Further, the control panel identifies the functional requirement according to a cursor indication position of a projection picture. The functional requirement includes an indication requirement and an input requirement. The control panel is configured as a touch mode after identifying the indication requirement. And the control panel is configured as an input mode after identifying the input requirement. When the indicator cursor on the projection picture is located in the non-editable area (which is the area limited by the system that the user can only click), the control panel can recognize the current functional requirement as a touch requirement, so that the control panel works in a touch mode. In this instance, the control panel can control the cursor to perform basic operations such as click, drag and selection. When the indicator cursor on the projection picture is located in the editable area (e.g. editable text file and text box), the control panel can recognize the current functional requirement as a input requirement, so that the control panel works in a input mode and is automatically configured as a keyboard input mode. In this instance, the control panel defines a visible keyboard area. As a preferred embodiment, the control panel includes a setting area for setting working parameters of the projection assembly and an operation area for issuing instructions in the touch mode and inputting data in the input mode. In the touch mode, the operation area is as the direct touch operation object, and a fixed keyboard on the operation area does not display or work. In the input mode, the operation area is as a direct touch operation object, the fixed keyboard on the operation area is displayed and can respond to the user's pressing operation as an input keyboard.

As shown in FIG. 1, in an embodiment, a layer of thin film, corresponding to the position of each key on the input keyboard of the control panel and capable of displaying the position of each key, is adhered to an opaque control panel. The thin film adopts conductor material capable of sensing touch operation. When the control panel is switched to the input mode, the user can carry out input operation by clicking on each key area limited by the thin film. In another embodiment, the control panel is a semitransparent structure, in which the position of each key of the keyboard is limited by the transparent portion. In another embodiment, the control panel further includes a backlight control assembly. When the control panel is switched to the input mode, the backlight control assembly works to light up the back light of the control panel. In this instance, the light pass through the transparent portion, and an obvious keyboard pattern is displayed on the control panel, so that the user can carry out input operation by clicking on each key area limited by the transparent portion. In another embodiment, the control panel can also have a laser projection unit. When the control panel is switched to the input mode, the laser projection unit is capable of projecting the laser keyboard to a plane and the user can carry out input operation by clicking on each key area of the laser keyboard.

Figure 3:
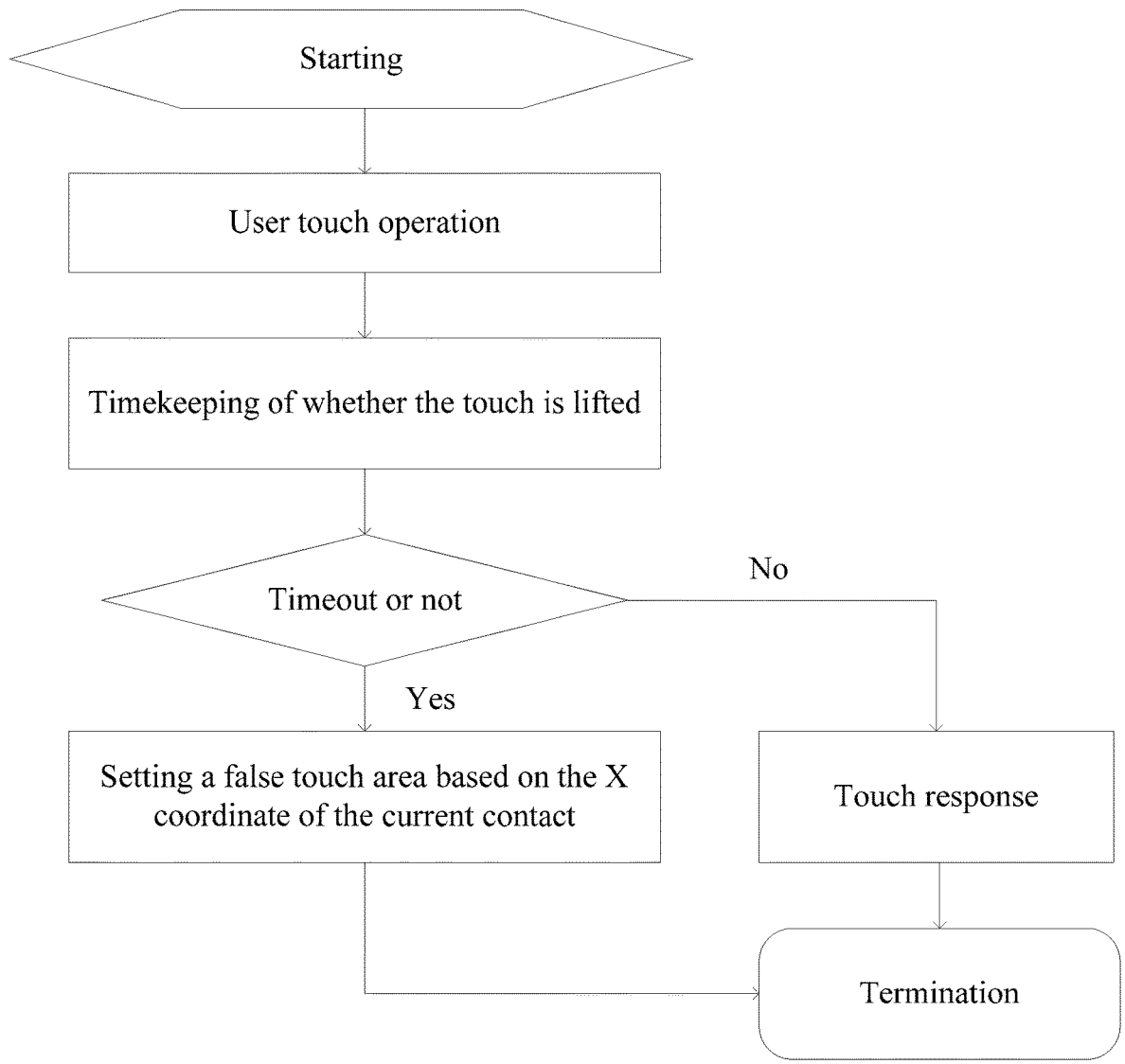
FIG. 3 is an algorithm flow chart of preventing false touch of the present disclosure.

In addition, the control panel has a built-in intelligent algorithm for preventing false touch, as shown in FIG. 3, including: the control panel recognizes the user's touch operation and starts timing. When the touch time exceeds the preset threshold, the control panel recognizes this touch as a false touch and limits a false touch range based on the currently touch point, and the system will not respond to other recognized touch operations within this false touch range. If the touch time does not exceed the preset threshold, the control panel will recognize this touch as a valid contact and the system will respond to this operation.

Besides, the projection assembly has a connecting area charging the control panel by means of a connecting device. As a preferred embodiment, the connecting device can realize the charging of the control panel by connecting the projection assembly in a contact or non-contact manner, such as a plug-unplug charging line or a connection module having wireless charging function.

As a preferred embodiment of the present disclosure, the connecting area is a groove configured to receive the control panel, and the connecting device includes a projection assembly charging contact arranged inside the groove and a connecting device charging contact arranged on the control panel. The control panel is matched with the groove arranged on the projection assembly. When the control panel is placed in the groove, the charging contact of the control panel is contacted with the charging contact arranged in the groove of the projection assembly. In this instance, the system charges the control panel through the contacts.

Figure 4:
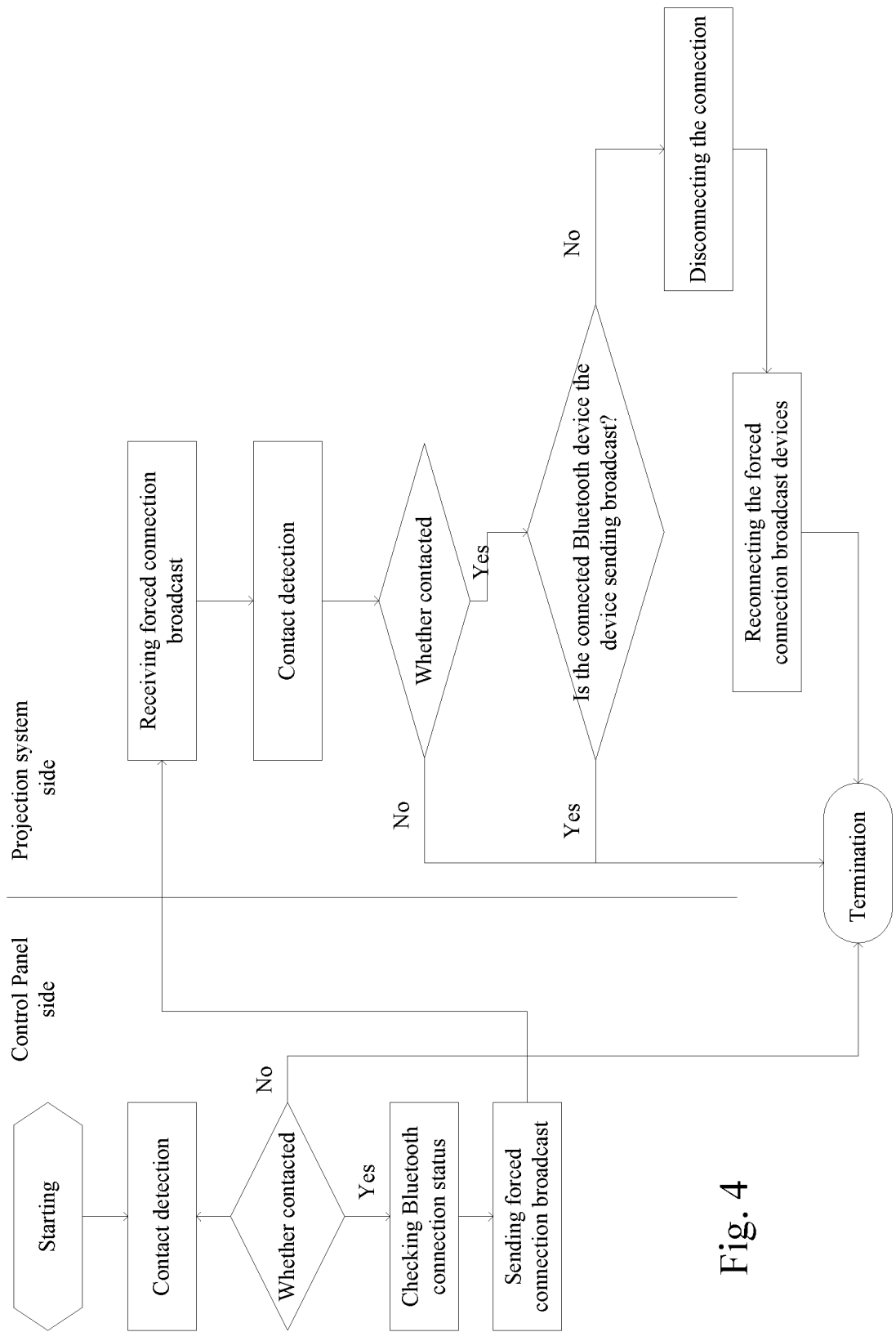
FIG. 4 is an algorithm flow chart of the contact detection for Bluetooth automatic connection of the present disclosure.

In another embodiment of the present disclosure, the connecting area is a groove configured to receive the control panel. The groove has a contact for the projection assembly and the control panel has a corresponding contact for the control panel. A connection between the projection assembly and the control panel is established by contacting the contact for the projection assembly with the corresponding contact for the control panel. Further, as shown in FIG. 4, the control panel judges whether the corresponding contact for the control panel is contacted with the contact for the projection assembly, if not, the connection is terminated, if contacted, a forced connection broadcast is sent out. When the projection assembly receives the forced connection broadcast and further judges whether the contact for the projection assembly is contacted with the corresponding contact for the control panel, if not, the connection is terminated, if contacted, further judges whether the connected control panel is the device that currently sends the forced connection broadcast, if so, the connection is terminated, if not, the original connection is disconnected, and the connection is terminated after the device that sends the forced connection broadcast device is reconnected.

In a preferred embodiment, a multiplex contact which can be used either as a charging contact or as a contact for the projection assembly/control panel is arranged in the connecting area. In this instance, the control panel distinguishes the functions of the contact in use according to the aforementioned contact false touch algorithm and the connection algorithm.

In addition, the projection assembly interacts data with the control panel in a wireless or wired manner. The wireless manner includes but is not limited to Bluetooth or WiFi 2.4 GHz.

Figure 2:
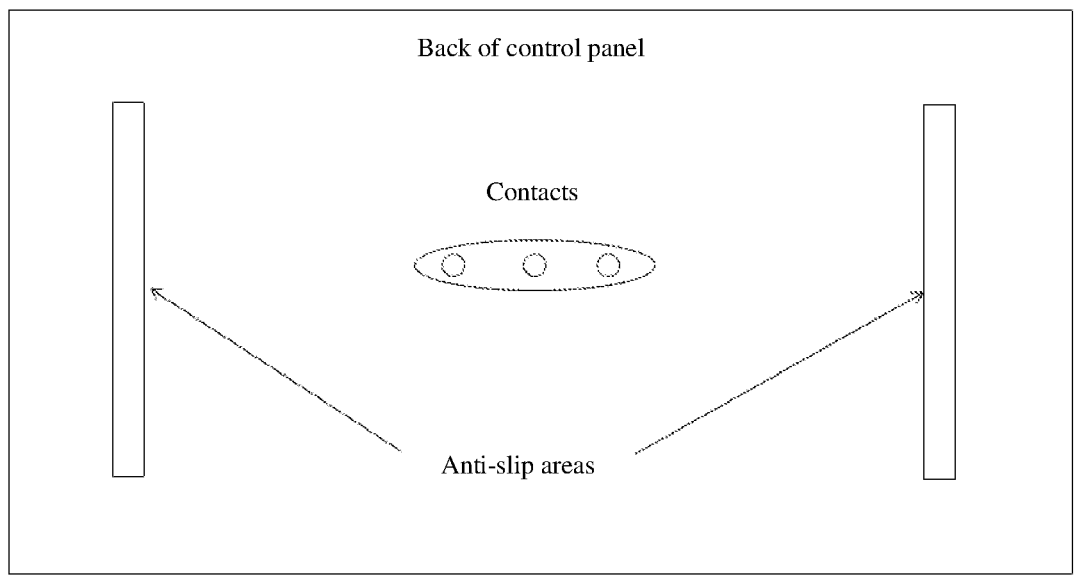
FIG. 2 is a bottom view of the control panel of the present disclosure.

Further, as shown in FIG. 2, the control panel has an anti-slip area on both sides of the back, which can provide a comfortable and stable interaction mode of plane placement.

Further, the projection assembly can be expansively connected with a multi microphone array and a wide-angle lens so as to realize the automatic pickup of voice input and visual input of the interaction system.

last, it should be stated that the above various embodiments are only used to illustrate the technical solutions of the present disclosure without limitation; and despite reference to the aforementioned embodiments to make a detailed description of the present invention, those of ordinary skilled in the art should understand: the described technical solutions in above various embodiments may be modified or the part of or all technical features may be equivalently substituted; while these modifications or substitutions do not make the essence of their corresponding technical solutions deviate from the scope of the technical solutions of the embodiments of the present disclosure.

The invention claimed is:

1. An interaction method for pairing a projection system comprising a projection assembly and a control panel, wherein the projection assembly comprises a first contact and the control panel comprises a second contact,
   wherein the method comprises the following steps of:
   S1, the control panel conducting, according to a connecting action between the projection assembly and the control panel, a first connection judgment for determining true or not the first contact and the second contact are connected, if true, the control panel sends out a forced connection broadcast, if not true, the connection is terminated;
   S2, after receiving the forced connection broadcast signal, the projection assembly conducting a second connection judgment for determining true or not the first contact and the second contact are connected,
   wherein:
   when the result of the second connection judgement is true, a pairing judgment is conducted for determining true or not the currently connected control panel is the one that sends the forced connection broadcast, if true, then a connection is established between the projection assembly and the control panel, and if not true, then the current connection for the projection assembly is disconnected, and a connection is established between the projection assembly and a control panel that sends out the forced connection broadcast; and
   S3, sending instructions and/or inputting data from the control panel to applications operated on the projection assembly connected to the control panel.

2. The interaction method according to claim 1, wherein S3 comprises:
   the control panel identifying a functional requirement according to a cursor indication position at a projection picture,
   wherein the functional requirement comprises indication requirements and input requirements,
   wherein:
   when the identified functional requirement is indication requirement, the control panel is configured to a touch mode, and
   when the identified functional requirement is input requirement, the control panel is configured to a keyboard input mode.

3. The interaction method according to claim 2, wherein the control panel identifying the functional requirement according to a cursor indication position at a projection picture comprises:
   the control panel identifying the current functional requirement as a touch requirement when the cursor on the projection picture locates in a non-editable area, and controlling the cursor to perform operations selecting from click, drag, and select; and
   the control panel identifying the current functional requirement as a input requirement when the cursor on the projection picture locates in an editable area, and configuring the control panel as the keyboard input mode.

4. The interaction method according to claim 2, wherein when the control panel is configured as the keyboard input mode, through lighting a backlight of the control panel, a visible keyboard is defined in the control panel in response to a user's pressing action.

5. The interaction method according to claim 1, wherein the control panel is charged by the projection assembly when the first contact and the second contact are connected.

6. The interaction method according to claim 1, wherein the control panel issuing instructions and/or inputting data to the applications operated on the projection assembly further comprises:

starting timing once the control panel recognizes a press action by a user, wherein:

when the press action lasts for a duration longer than a preset threshold, the control panel recognizes the press action as a false touch and limits a false touch area based on the touch point of the press action, then the projection assembly does not respond to other touches recognized within the false touch area;

when the press action lasts for a duration is not longer than the preset threshold, the control panel recognizes the press action as a valid touch, then the projection assembly will respond to the corresponding operation.

7. The interaction method according to claim 1, wherein the projection assembly comprises an expandable connected multi microphone array to realize automatic pickup of a voice input.

8. The interaction method according to claim 1, wherein the projection assembly further comprises an expandable connected wide-angle lens to realize automatic pickup of a visual input.

* * * * *